US011334683B2

(12) United States Patent
Woessner et al.

(10) Patent No.: US 11,334,683 B2
(45) Date of Patent: May 17, 2022

(54) METHOD FOR A MULTI-COUNTRY DATA PIPELINE TO PROTECT PERSONALLY IDENTIFYING INFORMATION

(71) Applicant: Pearson Education, Inc., Bloomington, MN (US)

(72) Inventors: Leo Woessner, Centennial, CO (US);
Jeffrey DeYoung, Parker, CO (US);
Ritu Saxena, Parker, CO (US);
Chadwick Reimers, Larkspur, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 209 days.

(21) Appl. No.: 16/522,512

(22) Filed: Jul. 25, 2019

(65) Prior Publication Data

US 2021/0026987 A1 Jan. 28, 2021

(51) Int. Cl.
*G06F 21/00* (2013.01)
*G06F 21/62* (2013.01)
*G06F 21/60* (2013.01)

(52) U.S. Cl.
CPC ........ *G06F 21/6254* (2013.01); *G06F 21/602* (2013.01); *G06F 21/604* (2013.01); *G06F 21/6263* (2013.01)

(58) Field of Classification Search
CPC .. G06F 21/602; G06F 21/6254; G06F 21/604; G06F 21/6263
See application file for complete search history.

(56) References Cited

U.S. PATENT DOCUMENTS

| 10,095,924 | B1* | 10/2018 | Miu ................... G06K 9/00442 |
| 2002/0099824 | A1* | 7/2002 | Bender ................ G06F 21/6254 |
| | | | 709/225 |
| 2014/0059343 | A1 | 2/2014 | Mohajeri et al. |
| 2015/0150144 | A1* | 5/2015 | Hughes ................ G06F 21/6254 |
| | | | 726/26 |
| 2017/0286717 | A1* | 10/2017 | Khi ........................ H04W 12/10 |
| 2020/0065521 | A1* | 2/2020 | Durvasula ........... H04L 63/0421 |

OTHER PUBLICATIONS

Pearson, Autobahn—Messaging Pipeline for Ingestion to Analytics, PPT Apr. 2018.

* cited by examiner

*Primary Examiner* — Ghazal B Shehni
(74) *Attorney, Agent, or Firm* — Quarles & Brady LLP

(57) ABSTRACT

A multi-country data pipeline keeps all of the PII received from a user that is in a first country in the first country. The data pipeline allows the non-personal data received from the user to be transmitted and analyzed in a second country. The method further allows the results of the analysis in the second country to be transmitted back to the first country where the PII is added to the results of the analysis. The data pipeline allows the results of the analysis in the second country to be used to take a desired action for the user in the first country, all while the PII of the user never leaves the first country.

20 Claims, 11 Drawing Sheets

METHOD FOR A MULTI-COUNTRY DATA PIPELINE TO PROTECT PERSONALLY IDENTIFYING INFORMATION

FIELD OF THE INVENTION

This disclosure relates to a multi-country message streaming platform built on a validated data pipeline, whereby personally identifying information (PII) never leaves the country of origin.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory. A message streaming platform comprises a plurality of publisher methods, wherein the plurality of publisher methods comprises a Java published software development kit and a REST API; a data ingestion unit configured to i) receive and archive data from the plurality of publisher methods, ii) tag the data with a producer, message-type, version and timestamp, iii) validate the data is in conformance with a predetermined schema, and iv) tag the data with an error message if the data is not in conformance with the predetermined schema; and a web services unit configured to provide the data to a plurality of different consumer services.

The invention, hereafter referred to as a message streaming platform, is an enterprise message streaming platform built around a validated data pipeline. The message streaming platform may be a data back-bone for any corporation with the need to receive, store and/or use data.

The client-side and producer-side software development kits may enable messages to be published and routed to private queues based on message type (examples: student joined a course, final course grade for a student, etc.)

The invention preferably has one or more of the following capabilities: creates a common service for publishing and conveyance of user activity and business events; supports loose coupling between Producers and Consumers; hides the underlying infrastructure from Producers and Consumers; provides a low barrier to adoption; performant, highly scalable, highly available, and highly reliable; supports 'at least once' delivery; provides a managed data archive; and backs up and validates conveyed messages using published schemas.

Prior systems were difficult to maintain and support, unable to scale, and they often had stability issues. In contrast, the invention may reduce individual component complexity, support independent scaling of features, and support deployment flexibility.

The invention may be a backbone for various business critical applications to support the information exchange between systems through messages. The invention may be an enterprise level data streaming platform to distribute corporate domain state changes and other messages across various producers and consumers. The invention may be designed for performance, scalability, message flow transparency, and guaranteed message delivery. Messages may be archived as well as published and routed to private queues based on message type and routing tags. The invention may be used by many different corporate services using and/or producing data.

The invention may have the advantages and features of a schema registry and promotion; a simple interface to publish new schemas and retrieve existing schemas; producer software development kits (SDKs); have a streamlined publishing interface; have a very low latency between internal components; allow consumer SDK—near real time data pull from the invention; comprise easy consumer implementation; include rapid message delivery; published API; REST API to publish events and activities; simple authentication supports both internal and external systems; status API and tracking UI; rest API to retrieve the status of published events and activities; an easy to use API allows customers to efficiently track messages from the time they are published through the time of their archival; data storage system—organized data storage in sequence files format; inexpensive long term storage; archives all messages; long term analytics; subscription management of APIs and UI tools.

In addition, the invention may have one or more of the following features: performant, highly scalable, highly available, highly reliable; near real time domain state change events sharing between systems; domain schema registration, validation, and management; provide a managed data archive; provide raw data for a large database (data lake), efficacy analysis, and data science; support loose coupling between Producers and Consumers; hide the underlying infrastructure from Producers and Consumers; have a low barrier to adoption—provide various SDKs for easy adoption; and provide no data loss—message lifecycle tracking.

In another embodiment, a multi-country data pipeline keeps all of the personally identifying information (PII) received from a user in a first country in the first country. The data pipeline allows the non-personal data received from the user to be transmitted and analyzed in a second country. The method further allows the results of the analysis in the second country to be transmitted back to the first country where the PII is added to the results of the analysis. The data pipeline allows the results of the analysis in the second country to be used to take a desired action for the user in the first country, all while keeping the PII of the user in the first country. In other words, the PII never leaves the first country.

The above features and advantages of the present invention will be better understood from the following detailed description taken in conjunction with the accompanying drawings.

DETAILED DESCRIPTION

Figure 1:
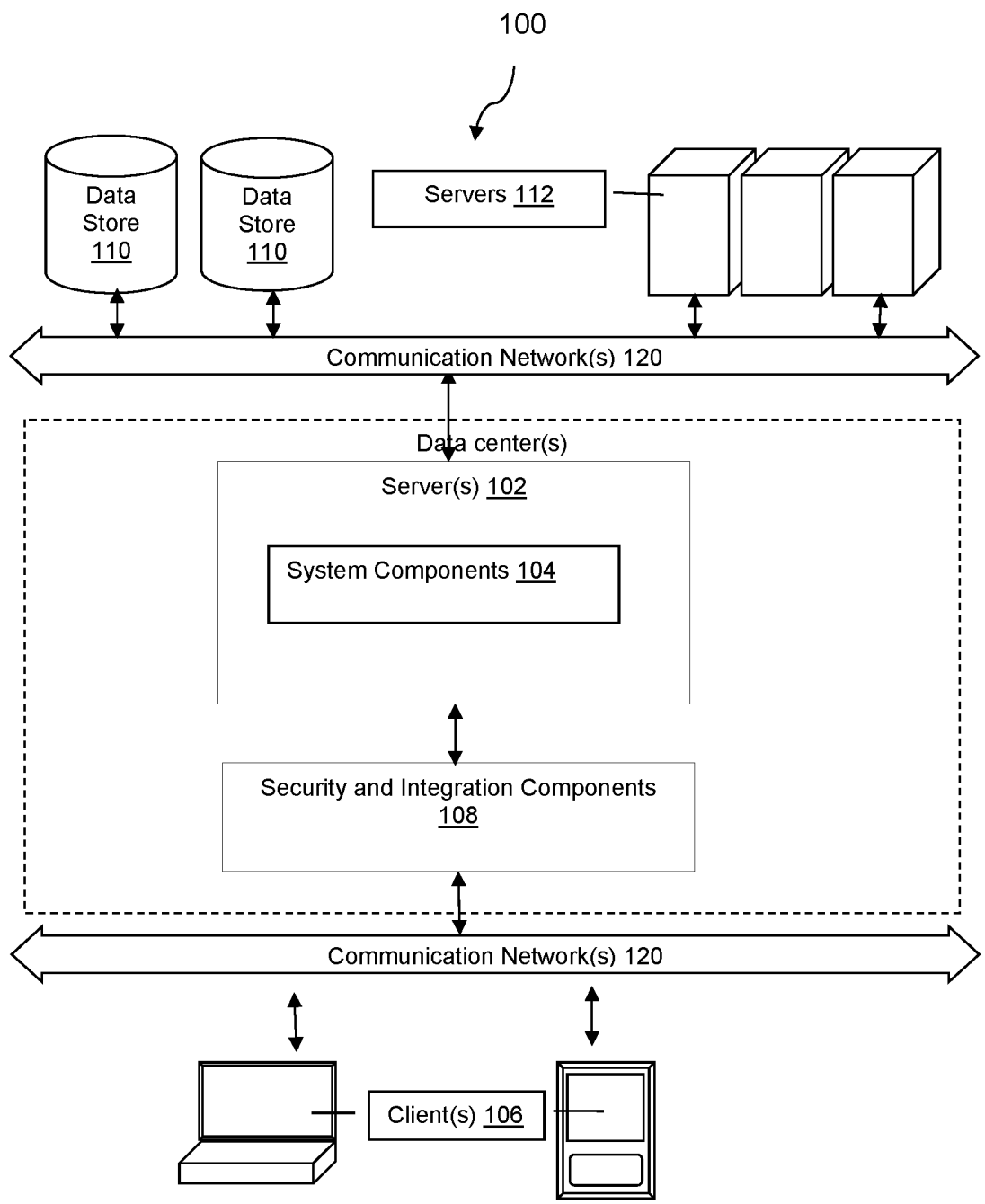
FIG. 1 illustrates a system level block diagram for a non-limiting example of a distributed computing environment that may be used in practicing the invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Network

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Servers/Clients

Figure 2:
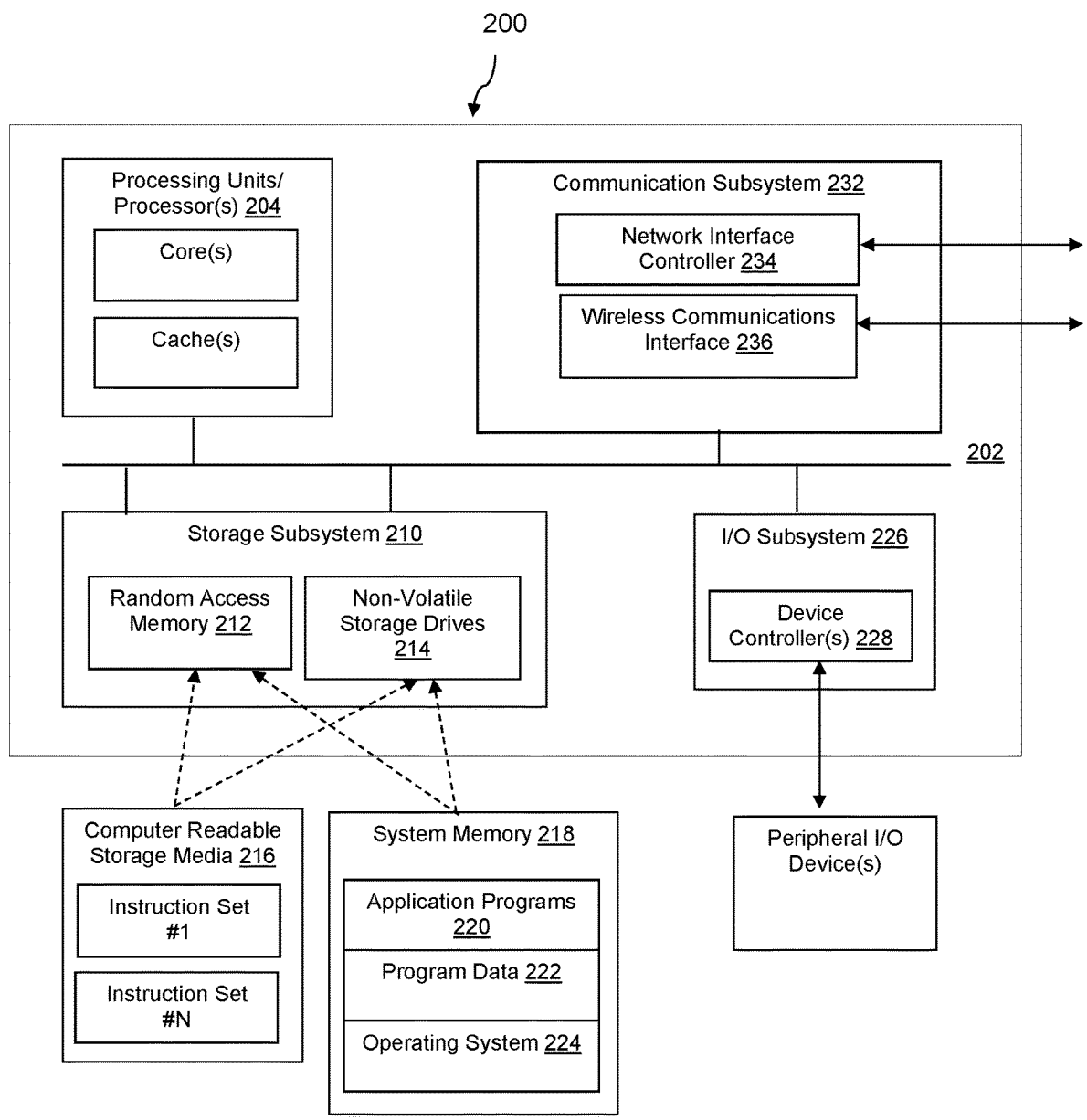
FIG. 2 illustrates a system level block diagram for an illustrative computer system that may be used in practicing the invention.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

Security

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users.

As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Data Stores (Databases)

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Computer System

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Processors

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Buses

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Input/Output

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

Input

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

Output

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Memory or Storage Media

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer Readable Storage Media

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communication Interface

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

Input Output Streams Etc.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

Connect Components to System

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Other Variations

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 3:
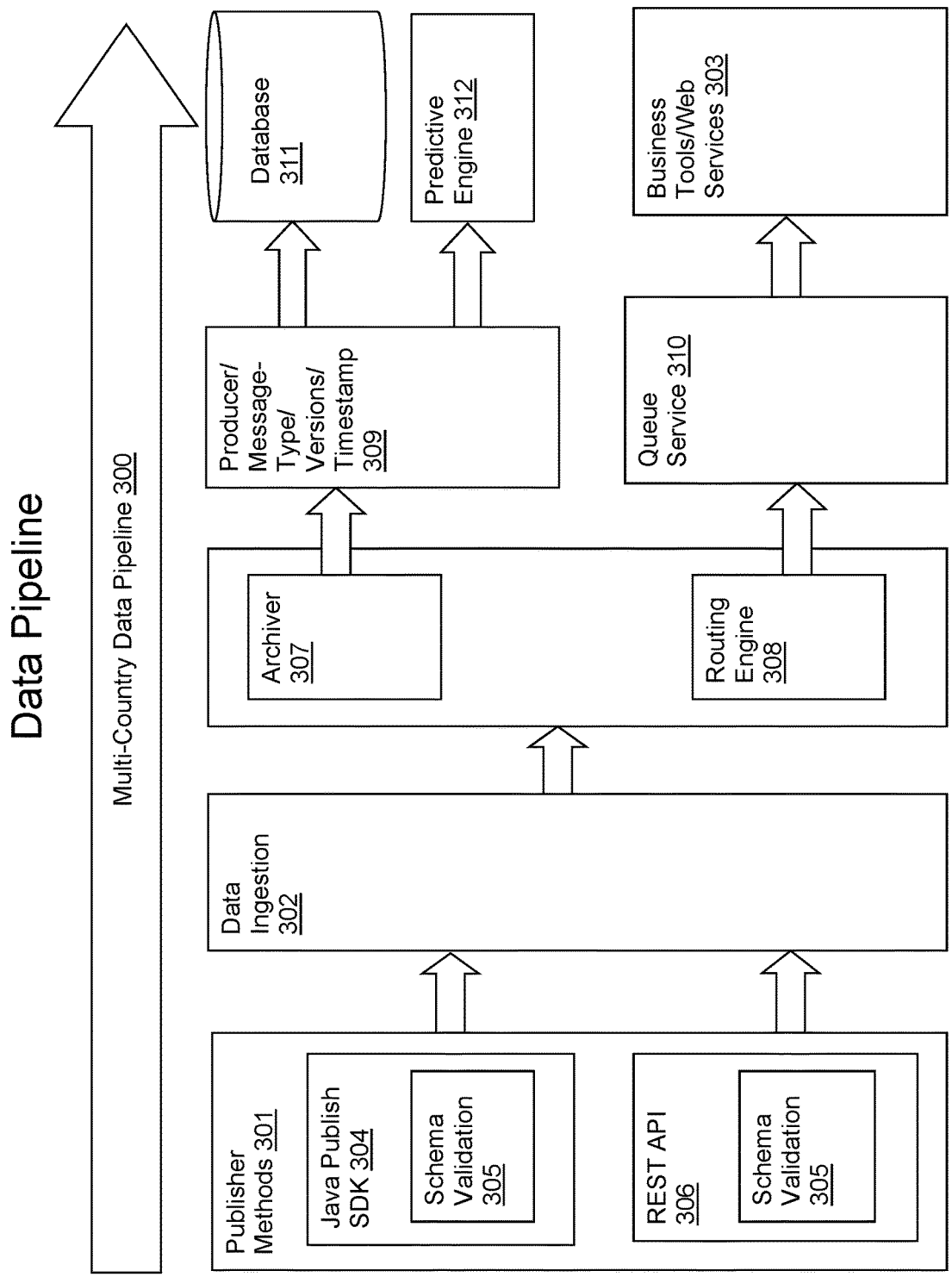
FIG. 3 illustrates a system level block diagram for an example Multi-Country Data Pipeline. In the illustrated embodiment, the Data Pipeline includes publisher methods, data ingestion, archiver, routing engine, Producer/Message-Type/Version/Timestamp, Queue Service, Database, Predictive Engine and Business Tools/Web Services.
Figure 4:
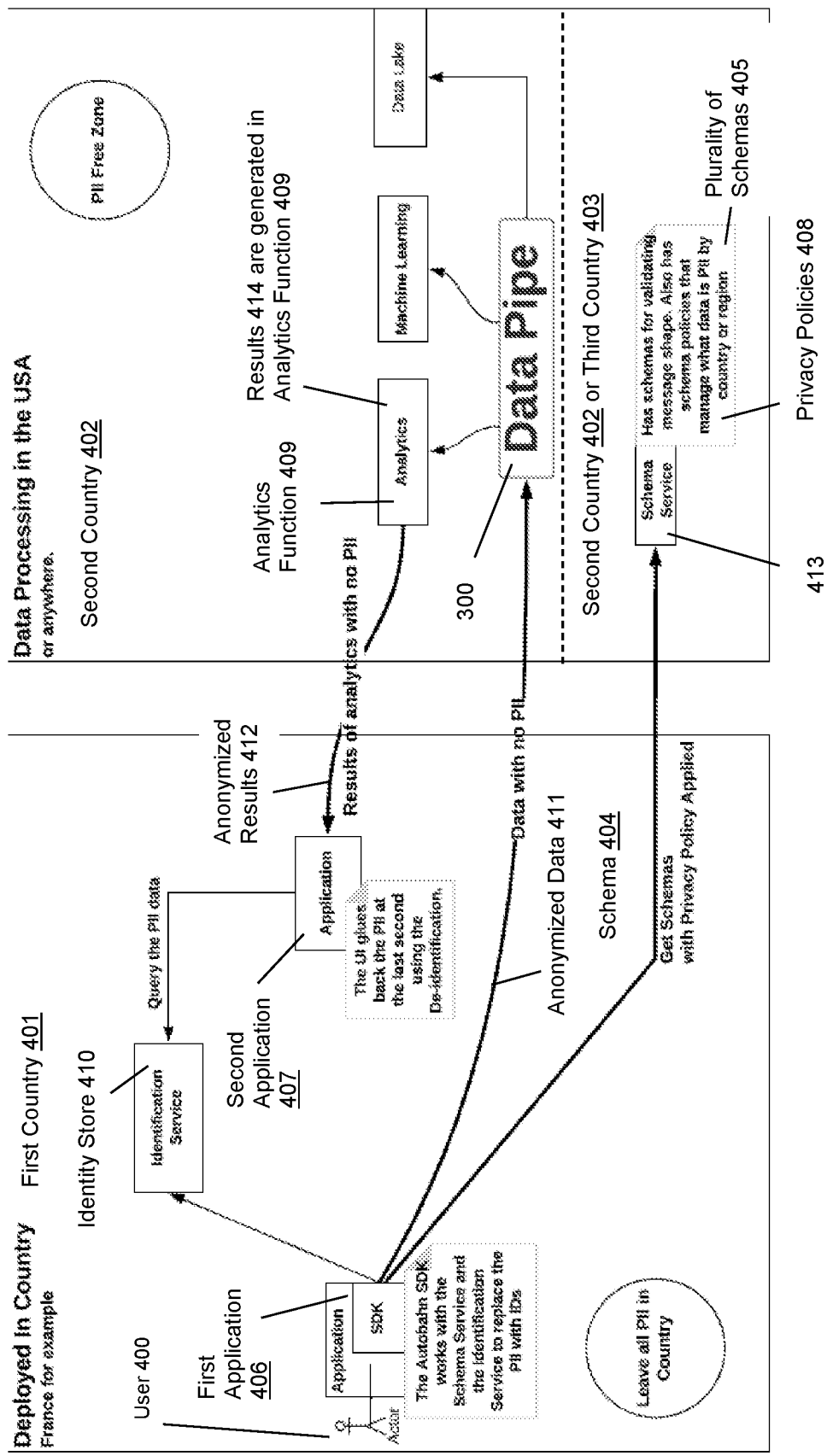
FIG. 4 illustrates a system level block diagram where the system is being used to de-identify data.
Figure 5:
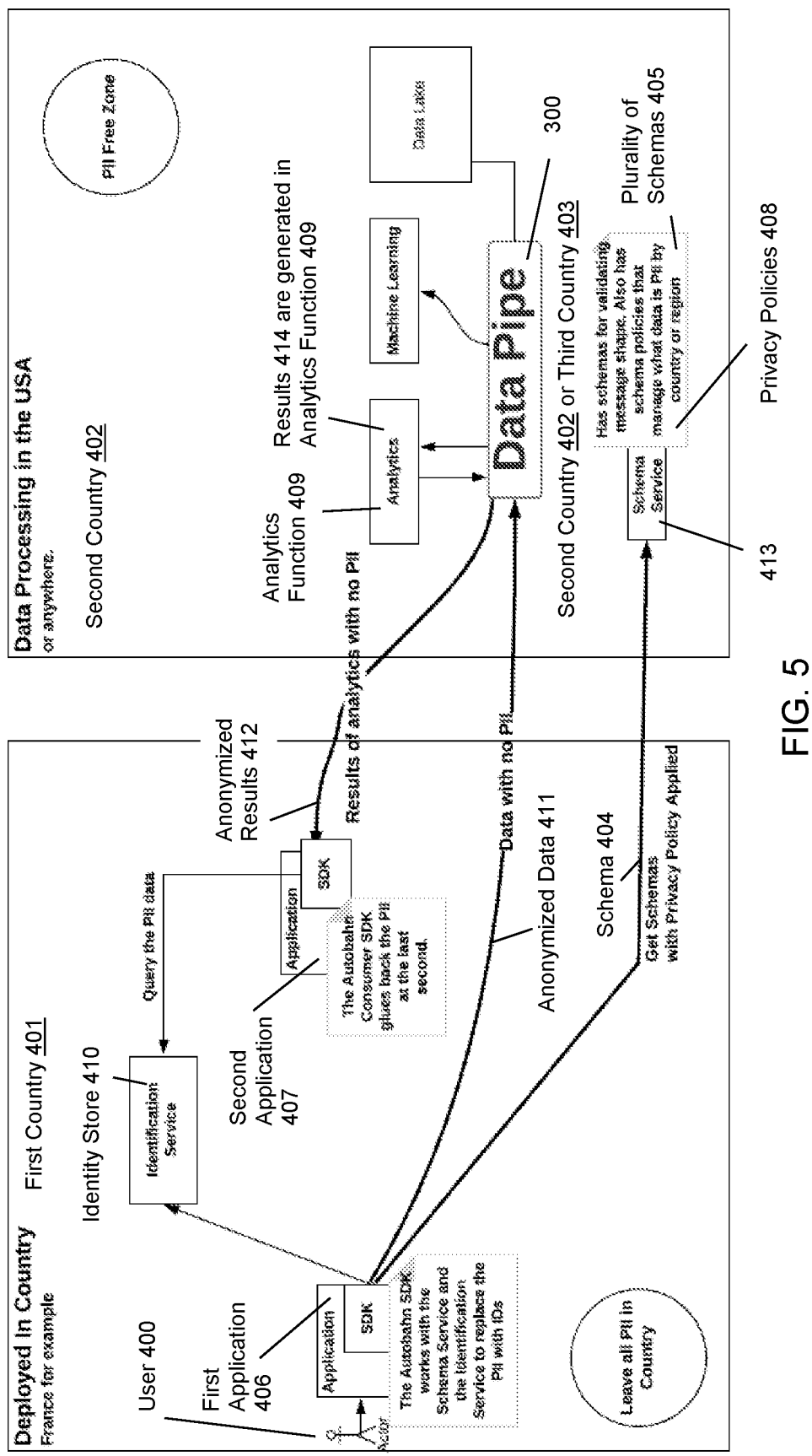
FIG. 5 illustrates a system level block diagram where the system is being used as a producer and a consumer.
Figure 6:
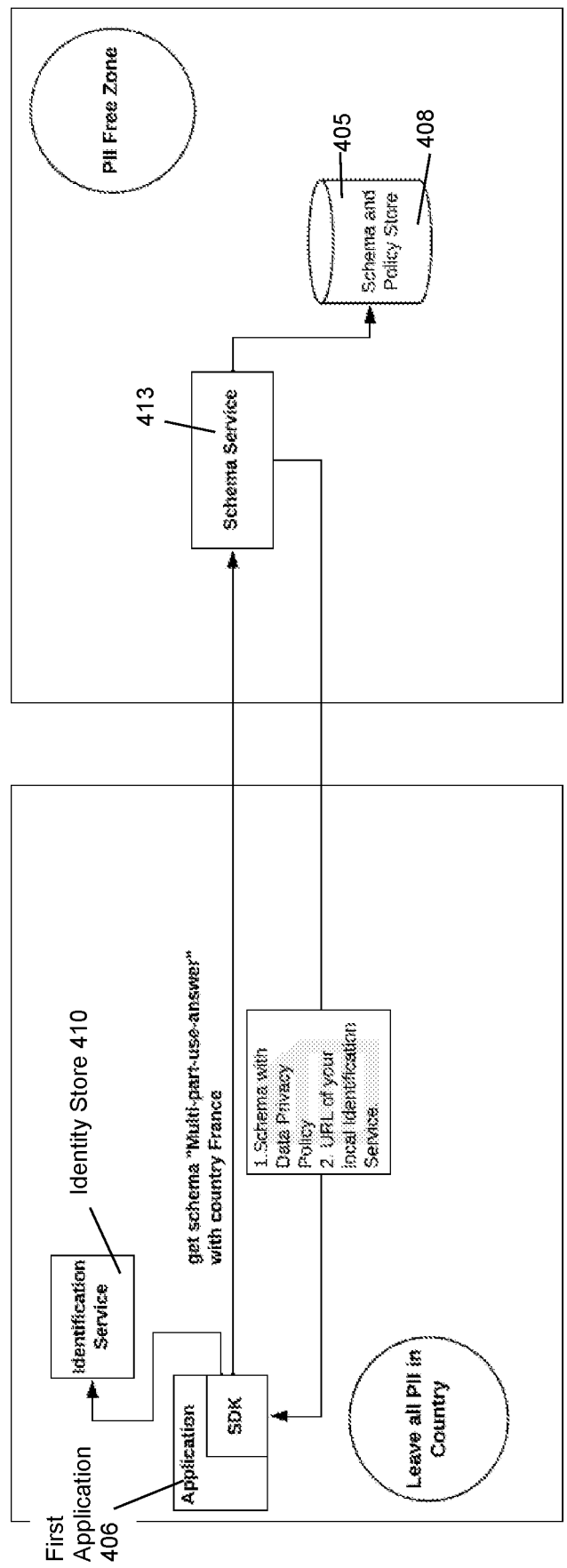
FIG. 6 illustrates a system level block diagram of a system with a Schema Service and an Identification Service.
Figure 7:
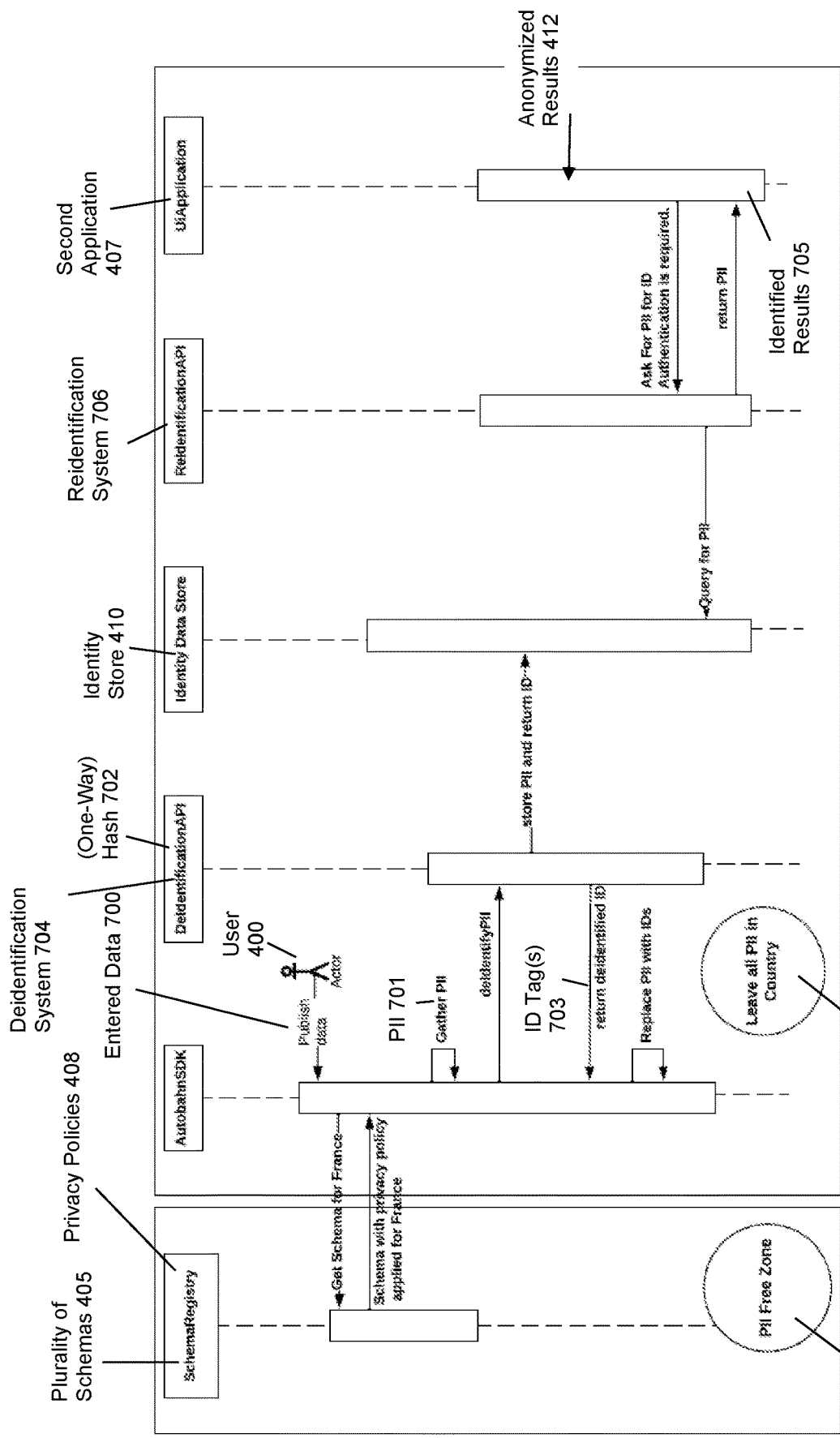
FIG. 7 illustrates a flow of information from a user in a first country, where a system removes all PII before transmitting the information to a second country. The information is analyzed in the second country and transmitted back to the first country where the PII is added to the analyzed results.
Figure 8:
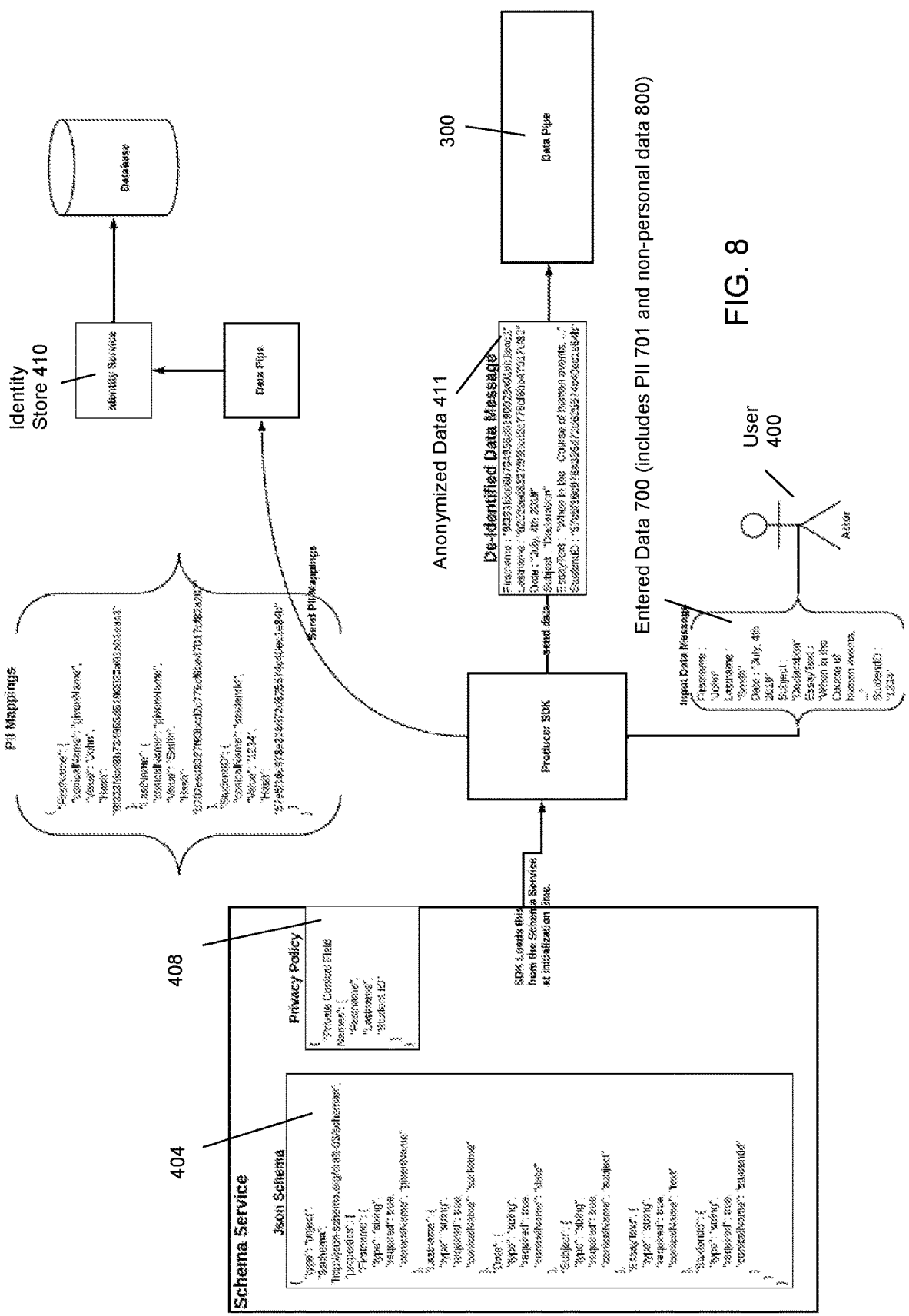
FIG. 8 illustrates a removal of PII from entered data from a user. The entered data includes PII and non-personal data and a Schema Service provides a Schema (that has a privacy policy for a country or a region) to help determine which data in the entered data is PII and which data in the entered data is non-personal data.
Figure 9:
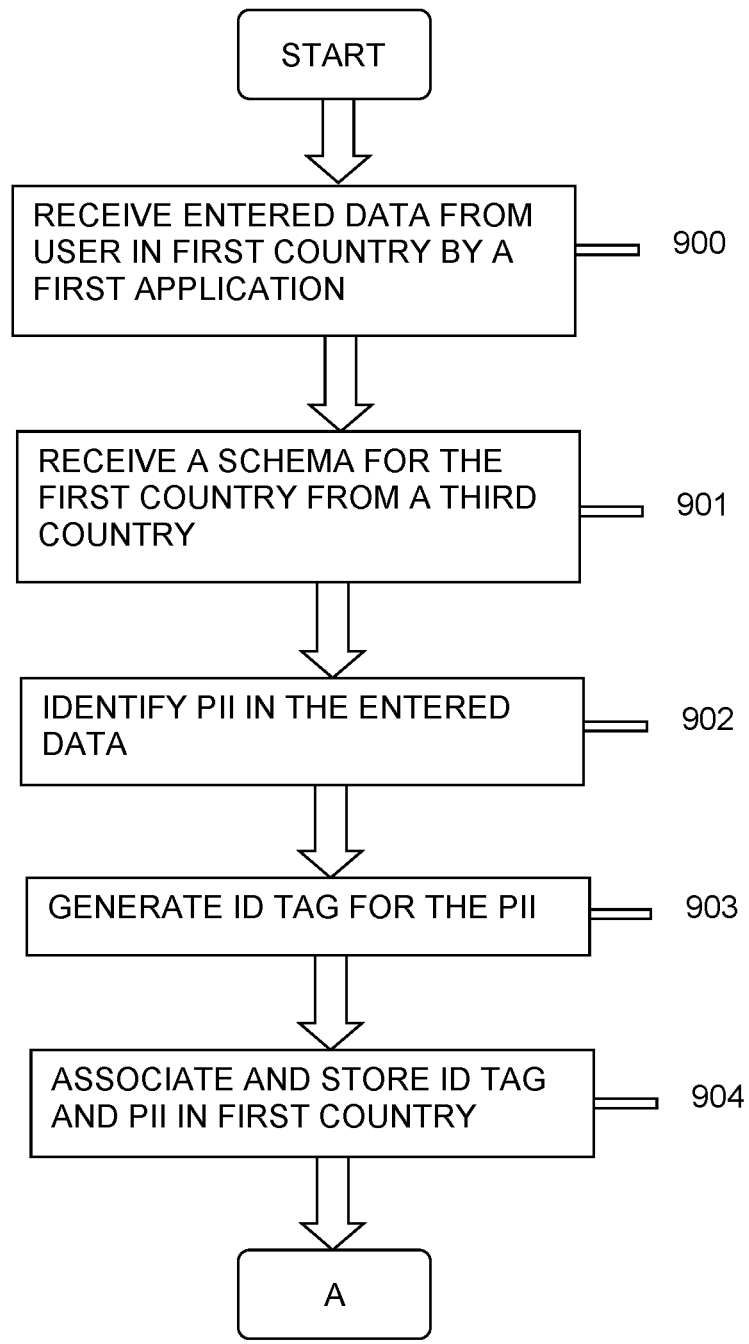
FIGS. 9-11 illustrate a flow chart representing a possible method of practicing the present invention.
Figure 10:
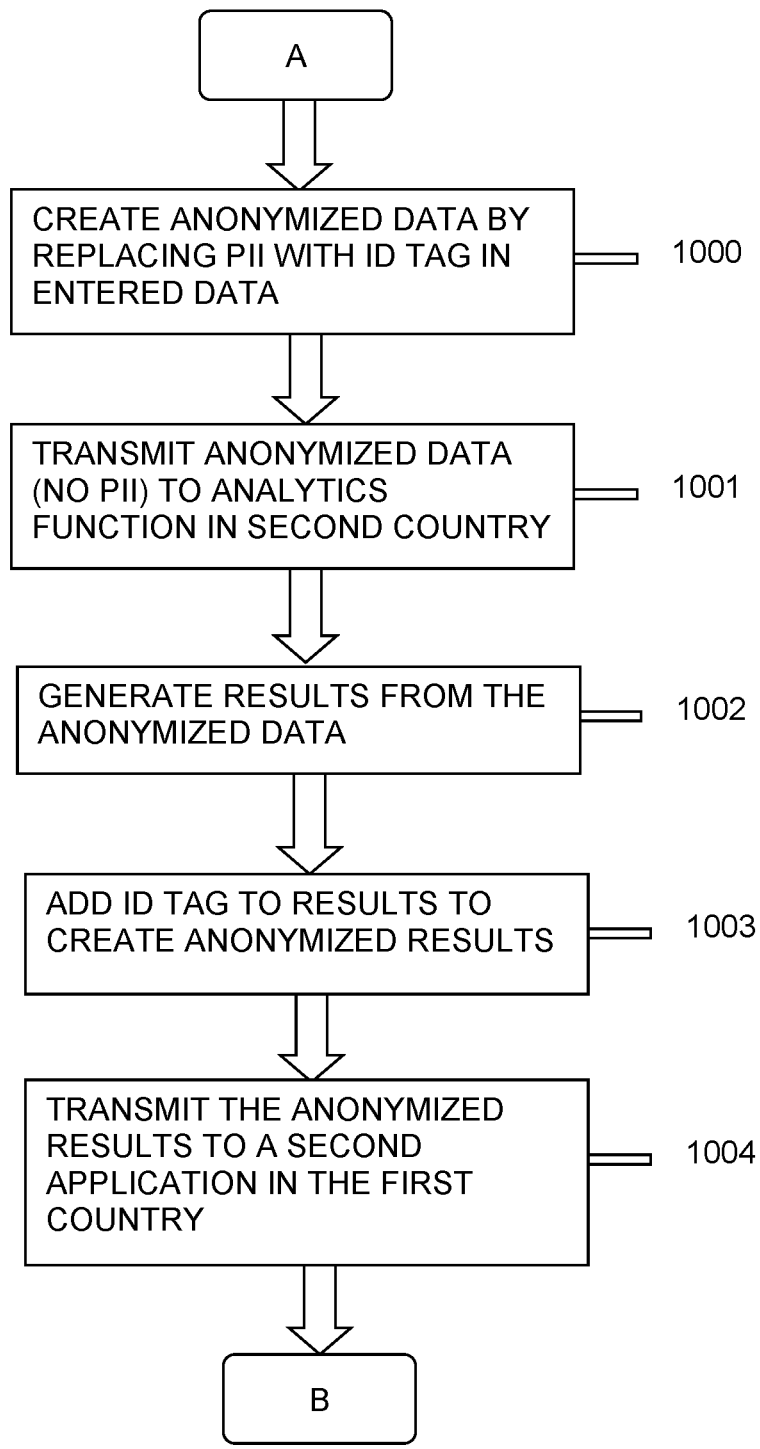
Figure 11:
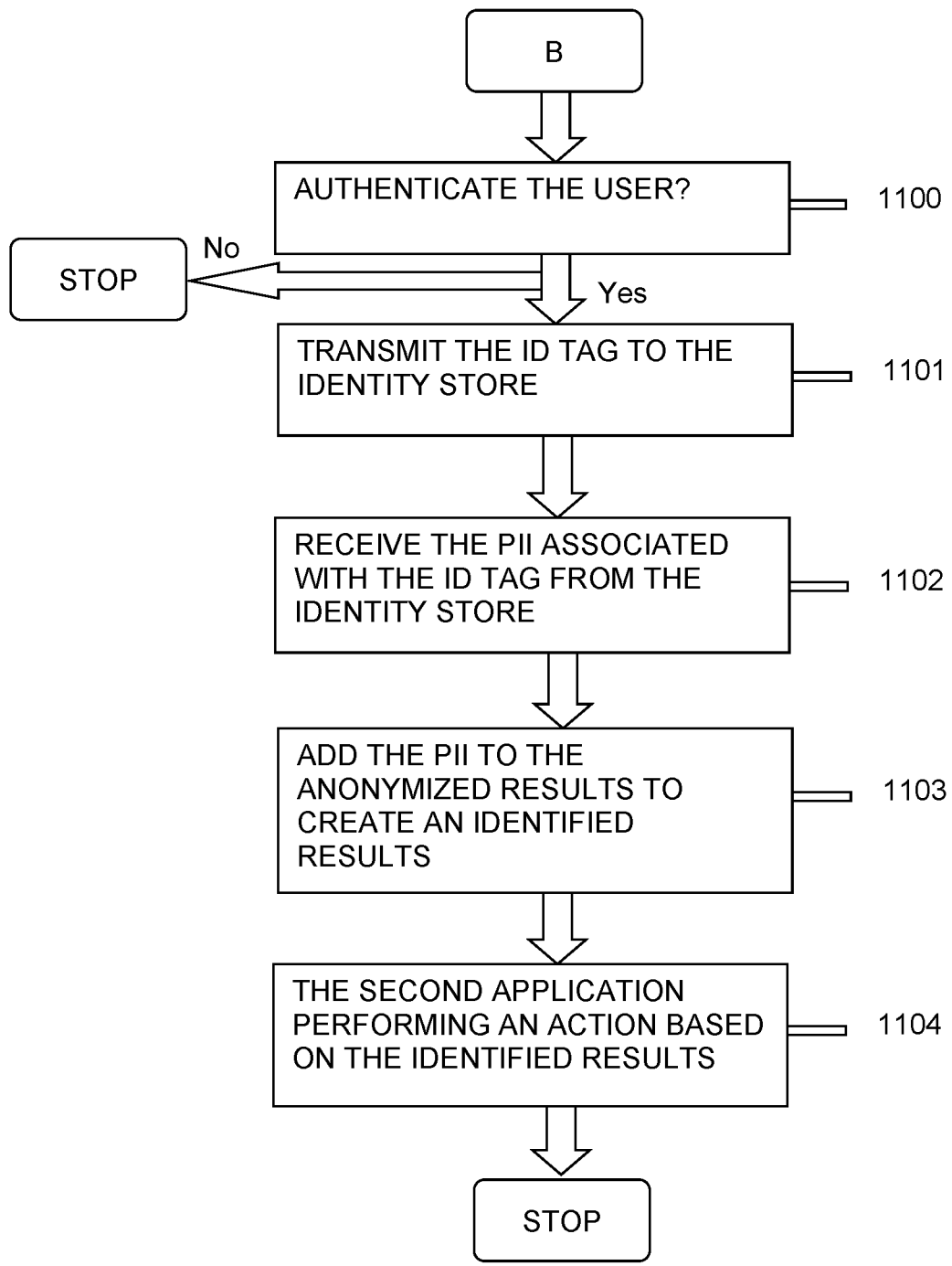

Referring to FIG. 3, the invention, hereafter sometimes referred to as Autobahn or Message Streaming Platform, is an enterprise message streaming platform built around a validated data pipeline 300. The message streaming platform may be a data back-bone for any corporation with the need to receive, store and/or use data.

The client-side and producer-side software development kits will enable messages to be published and routed to private queues based on message type (examples: student joined a course, final course grade for a student, etc.)

The invention preferably has one or more of the following capabilities: creates a common service for publishing and conveyance of user activity and business events; supports loose coupling between Producers and Consumers; hides the underlying infrastructure from Producers and Consumers; provides a low barrier to adoption; performant, highly scalable, highly available, and highly reliable; supports 'at least once' delivery; provides a managed data archive; and conveyed messages may be backed and validated by published schemas.

Prior systems were difficult to maintain and support, unable to scale, and they often had stability issues. In contrast to prior systems, the invention may reduce individual component complexity, support independent scaling of features, and support deployment flexibility.

The invention may be the backbone for various business critical applications to support the information exchange between systems through messages. The invention may be an enterprise level data streaming platform to distribute corporate domain state changes and other messages across various producers and consumers. The invention may be designed for performance, scalability, message flow transparency, and guaranteed message delivery. Messages may be archived as well as published and routed to private queues based on message type and routing tags. The invention may be used by many different corporate services using and/or producing data.

The invention may have the advantages and features of a schema registry and promotion; a simple interface to publish new schemas and retrieve existing schemas; producer software development kits (SDKs); have a streamlined publishing interface; have a very low latency between internal components; allow consumer SDK—near real time data pull from the invention; comprise easy consumer implementation; include rapid message delivery; published API; REST API to publish events and activities; simple authentication supports both internal and external systems; status API and tracking UI; rest API to retrieve the status of published events and activities; an easy to use API allows customers to efficiently track messages from the time they are published through the time of their archival; data storage system—organized data storage in sequence files format; inexpensive long term storage; archive all messages; long term analytics; subscription management of APIs and UI tools.

In addition, the invention may have one or more of the following features: performant, highly scalable, highly available, highly reliable; near real time domain state change events sharing between systems; domain schema registration, validation, and management; provide a managed data archive; provide raw data for data lake, efficacy analysis, and data science; support loose coupling between Producers and Consumers; hide the underlying infrastructure from Producers and Consumers; have a low barrier to adoption—provide various SDKs for easy adoption; and provide no data loss—message lifecycle tracking.

The present invention provides systems and methods comprising one or more server hardware computing devices or client hardware computing devices, communicatively coupled to a network, and each comprising at least one processor executing specific computer-executable instructions within a memory. A message streaming platform comprises a plurality of publisher methods 301, wherein the plurality of publisher methods 301 comprises a Java published software development kit and a REST API; a data ingestion unit 302 configured to i) receive and archive data from the plurality of publisher methods 301, ii) tag the data with a producer, message-type, version and timestamp, iii) validate the data is in conformance with a predetermined schema, and iv) tag the data with an error message if the data is not in conformance with the predetermined schema; and a web services 303 unit configured to provide the data to a plurality of different consumer services.

There may be two easy ways to publish messages to the message streaming platform, Producer SDK (Java) and Publishing API. The invention may also include complete message Tracking: message tracking from ingestion to delivery. All messages may be archived to a data storage system: Used for PLA analytics, long term backup, and replay.

The invention may use either a SDK or a REST service. Preferred embodiments use a SDK as a SDK allows very fast consumption. REST APIs are not that slow, but the time latency can be critical in a messaging system like the present invention. SDKs also allow for an efficient implementation as there is minimal code needed and the threading is pre-managed for the user. An SDK also allows the system to keep the hardware and infrastructure costs down by not having to maintain a large cluster of nodes that sit in front of the queues.

As messages are published to the system, a routing engine reads subscription rules and routes messages to specific queues based upon subscriptions. One message may be routed to no queues, one queue, or many queues depended upon the subscription rules that are currently set. Routing rules can change at any time based on the consumer's needs.

Queues subscribe to messages based on message type (namespace/messageTypeCode/version) and tags. Tags can be matched based on OR logic, but may also use full Boolean logic (AND, OR, NOT, etc). Additionally, various methods of string matching may be used on the tags, including, but not limited to: regular expressions (Regex) or near-string matching. Since users may have more than one queue, the user may be asked for a variable name to uniquely identify their queue. Queue setup configuration may be a manual process; the user may have to tell the system administrators what messageType(s) the user wants to see in the queue, and what tags the user would like. Additionally, any arbitrary metadata field may be routed in a similar manner. The system may also have an API to allow users to create and manage queues on their own.

A Queue Management UI may also be used. Schema management includes Schema registry & schema versioning Schema validation at publish time. Thus, the system is a highly scalable architecture.

Messages may be JSON. In preferred embodiments, there may be no concept of a "channel" or "topic" in the system. Messages may be routed based on the type of message published. There may be a 1:1 relationship between the type of the message and the JSON schema that the message is validated against.

Message types and schemas may be identified by namespace, messageTypeCode, and versions. Messages may be schema validated at publish time. Each message streaming platform message that is successfully published may get a trackingId. This may be used to track the message throughout its lifecycle. A user may have their ID (Identity) whitelisted with the system prior to integration.

Messages may be made up of two parts: The metadata, sometimes called the "message envelope". These fields may be used for message routing, logging, validation, and troubleshooting. These fields are transmitted in plaintext, and should never contain PII or other sensitive data. The second part is the payload, the actual body of the message. This is the part of the message that is schema validated. The invention may not care what the payload is, as long as it's valid; it may not even be logged.

Messages can have tags added to the metadata to help with message routing and filtering. Tags are name/value pairs and may have a maximum, such as 10. Tags are kept in the metadata and delivered to the consumer; consumer can use these for additional processing if desired.

Stream Types

Activities: An Activity conveys an experience that has occurred, typically a person's experience. Activities are sent based on a person doing something. They follow the [actor] [verb] [object] model except that we build the [verb] into the name.

Examples: UserStartsAssessment where [actor] is the person defined in the message, starts is the [verb], and Assessment is the [object] defined in the message. UserAnsweredAssessmentItem where [actor] is the person defined in the message, answered is the [verb], and Assessment Item is the [object] defined in the message.

Events: An Event describes something that has occurred in an application. When something important has occurred, a domain state change for example, an application will raise an Event.

It should be appreciated that other stream types are also possible for use with the present invention. For example, it is possible that a third stream type may be used for user telemetry data (the footprints of the user through the application interface). Another embodiment may include another stream for system-level events (events about the systems themselves, such as errors, application startups, shutdowns, or version changes). The present invention contemplates that there are many other potential additional stream types that may be used.

Method of Protecting PII

Recent national regulations are requiring businesses not to export PII data from the country in which the user resides. With reference to FIGS. 4-11, a method for a multi-country data pipeline 300 to protect personally identifying information (PII 701) for each user 400 in a plurality of users will now be described. At a high level of understanding, the present invention keeps all of the PII 701 received from a user 400 in a first country 401 in the first country 401. The data pipeline 300 allows the non-personal data 800 received from the user 400 in the first country 401 to be transmitted and analyzed in a second country 402. The data pipeline 300 further allows the results 414 of the analysis in the second country 402 to be transmitted to the first country 401, where the PII 701 may be added to the results 414 of the analysis. The method further allows the results 414 of the analysis with the PII 701 to be used in the first country 401 to take a desirable action for the user.

The present invention may include a first application 406 operating entirely in a first country 401. In other words, all of the hardware and software running the first application 406 are physically located in the first country 401 along with a user. The user, also physically located in the first country 401, may enter data (entered data 700) using the first application 406. The first application 406 may be running on a client device of the user 400, running in a private data center running on hardware servers physically located in the first country 401 or running as Software as a Service (SaaS) running on hardware servers physically located in the first country 401. The hardware servers physically located in the first country 401 may be part of a multi-country data pipeline 300. Thus, the user 400, the PII 701 in the entered data 700 and the first application 406 are all physically located in the first country 401. (Step 900)

The data entered by the user 400 (entered data 700) may include PII 701 and non-personal data 800. It should be noted that what constitutes PII 701 may vary from country to country. PII 701 is typically any information that may potentially be used to identify or trace an individual's identity. Typical examples of PII 701 in many countries are a user's name, government issued identifications (such as a Social Security number in the US), driver license number, date of birth, place of birth, mother's maiden name, biometric records, medical records, mailing address, email address and phone numbers. Non-personal data 800 is data that cannot be used to identify an individual and is hereby defined to be the information in the entered data 700 that is not PII 701.

The first application 406 may transmit a request for a schema 404 to a Schema Service 413 located in a third country 403. It should be appreciated that the second country 402 (where an analytics function 409 is located) may be the same as the third country 403 (where the Schema Service 413 is located) or a different country with little impact on the efficiency and security of the invention. While the invention is designed for the situation where the first country 401 is different from the second country 402 and the third country 403, the invention would work even if all three countries were the same (there would just be extra unneeded overhead involved in the transmittal of the data). The Schema Service 413 may store a plurality of schemas 405, with each schema 404 containing a privacy policy for a specific country or region. In this way the Schema Service 413 may have a schema 404 for each country or region covered by the multi-country data pipeline 300. This is necessary as all countries do not have the same privacy policy 408. Placing all of the schemas 405 for all of the countries and regions used by the data pipeline 300 in one location (third country 403) makes it easier to update the schemas 405 as needed and insure that all of the schemas 405 are always up to date.

The Schema Service 413, in the third country 403, may transmit the requested schema 404 to the first application 406, in the first country 401. (Step 901) The transmitted schema 404 contains the privacy policy 408 for the first country 401. The privacy policy 408 preferably identities which types of information, such as, as non-limiting examples, full names, telephone number, and email addresses are PII 701. All other types of information not identified as PII 701 in the privacy policy 408 may be considered non-personal data 800 for the purposes of the present invention.

Using the privacy policy 408 in the received schema 404, the first application 406 may identify the PII 701 and the non-personal data 800 in the entered data 700 from the user. (Step 902) The privacy policy 408 may state that any number of different types of information are PII 701. Thus, if the privacy policy 408 in the received schema 404 states that, as a non-limiting example, names are PII 701, the first application 406 may parse through the entered data 700 and identify all of the names in the entered data 700. The first application 406 should also, for each type of information that is stated to be PII 701 in the schema 404, parse through the entered data 700 so that all of the PII 701 in the entered data 700 is identified. (Step 902)

In some embodiments, the entered data 700 may comprise a plurality of fields with each field holding a different type of information. The fields of the types of information that correspond to PIIs 701 as stated in the privacy policy 408 in the schema 404, such as a phone number, may thus be used to identify which information in the entered data 700 is PII 701. As a specific example, the schema 404 may say that names are PII 701, so the first application 406 may identify "John Smith" in the entered data 700 as PII 701. In some embodiments, the entered data 700 may have a field identified as name and "John Smith" may be in that field labeled as name. This process may be continued for each type of PII 701 listed in the privacy policy 408 of the schema 404 for the first country 401.

Other data in the entered data 700 that was not identified in the entered data 700 as PII 701 may be considered non-personal data 800. As a specific example, a score for a user 400 for test A, such as an "83%," may be considered non-personal data 800 in the entered data 700, assuming a score for test A is not considered PII 701 in the privacy policy 408 in the schema 404.

The present invention may create an identification tag (ID tag 703) for the PII 701 in the entered data 700. This may be accomplished in any desired manner, but should result in a unique ID tag 703, where the unique ID tag 703 cannot be used to recreate any of the PII 701. As a non-limiting example of a method, a random string/number/UUID 702 or a one-way hash 702 may be used to generate ID tag(s) 703. In preferred embodiments, the hash or encoding is entirely one-way with no way of reverting the ID tag(s) 702 back to it's original value (PII 701) without the mapping key.

In an embodiment of the invention, a single ID tag 703 may be created for all of the PII 701 in the entered data 700. In another embodiment, an ID tag 703 may be generated for each piece of PII 701 (such as a name and a telephone number) in the entered data 700. This could result in multiple ID tags for multiple PII 701 in a single entered data 700 from the user.

The ID tag(s) 703 and PII 701 are stored in a database in an identity store 410 in the first country 401. This process insures that the PII 701 never leaves the first country 401, a key aspect of the invention. A deidentification system 704, which may include, work with or be part of the identity store 410, may be used to anonymize data by removing PII 701 and adding ID tags that may be used to regain the PII 701. A reidentification system 706, which may include, work with or be part of the identity store 410, may be used to deanonymize data by adding PII 701 to anonymized data 411 based on the ID tags in the anonymized data 411. In preferred embodiments, the reidentification system 706 and the deidentification system 704 are firewalled off so they cannot be accessed outside the first country 401 in which they reside.

The ID tag(s) 703 and PII 701 may be stored in any format and using any desired protocol, but must be stored such that given the ID tag(s) 703, the associated PII 701 may be determined. As a non-limiting example, the ID tag(s) 703 and PII 701 may be stored in a table in the same row, so that once an ID tag 703 is matched in a given row, the remaining information in the row may be determined to be the PII 701 associated with the ID tag 703. (Step 904) In another embodiment, the ID tag(s) 703 may be linked in a database to their associated PII 701, so that given the ID tag(s) 703, the associated PII 701 in the database may later be determined.

Anonymized data 411 may be created by removing the PII 701 from the entered data 700 and adding the ID tags to all or some portion of the remaining entered data 700. (Step 1000) This may be accomplished, as a non-limiting example, by replacing the PII 701 with an ID tag 703 (or ID tags). In this manner, the anonymized data 411 may include all or some portion of the entered data 700 (which would be all or some portion of the non-personal data 800) and one or more ID tags, but the anonymized data 411 does not include any PII 701 or information that may be used to determine the PII 701 without assistance from the identity store 410 in the first country 401. Thus, the anonymized data 411 may be safely transmitted from country to country without the possibility of an exposure of the PII 701.

The anonymized data 411 may thus be safely transmitted through a multi-country data pipeline 300 from a first country 401 to a second country 402 as the anonymized data 411 does not contain any PII 701. In a preferred embodiment, the anonymized data 411 may be transmitted to an analytics function 409 within the second country 402. (Step 1001)

The analytics function 409 may receive anonymized data 411 from any number of different users located in any number of different countries. As the anonymized data 411 does not contain PII 701, the analytics function 409 may freely analyze all of the anonymized data 411 and perform any desired analysis on all or any portion of the anonymized data 411 received to produce any number of different results 414. (Step 1002)

As a specific example, the analytics function 409 may determine an average score for all of the users who took Test A and submitted their anonymized data 411 to the analytics function 409. Thus, the analytics function 409 may generate, as a non-limiting example, a result of a score of "77%" as the arithmetic average for Test A. Of course, any desired number and types of analysis may be performed by the analytics function 409 using the anonymized data 411 from one or more users.

The analytics function 409 may add the ID tag(s) 703 from the anonymized data 411 to one or more results 414 to produce anonymized results 412. (Step 1003) The anonymized results 412 do not contain any PII 701, so the anonymized results 412 may be freely transmitted from the analytics function 409 in the second country 402 to a second application 407 in the first country 401, without the possibility of exposing any PII 701. (Step 1004) The second application 407 may be the same as the first application 406 or be an entirely different application.

The second application 407 may attempt to authenticate the user 400 using any desired authentication method. As specific examples, the second application 407 may verify that the user 400 knows something, such as a user name and a password. The second application 407 may verify that the user 400 has something, such as a cell phone or an email account. The second application 407 may verify that the user 400 matches biometric records previously stored for the user. Some embodiments of the invention may use all or some combination of these authentication methods. If the user 400 is not authenticated, the second application 407 does not expose any PII 701 to the unauthenticated user. (Step 1100)

Once the user 400 is authenticated, the second application 407 (in the first country 401) transmits the ID tag(s) 703 to the identity store 410 (in the first country 401). (Step 1101) The identity store 410 may use the ID tag(s) 703 to determine the PII 701 for the user 400 that is associated with the ID tag(s) 703. The identity store 410 may transmit the PII 701 to the second application 407. (Step 1102)

The second application 407 may combine the PII 701 from the identity store 410 with the anonymized results 412 to create an identified results 705. (Step 1103) It should be appreciated that the identified results 705 contains PII 701 for the user 400 and contains results 414 from the analytics function 409. The second application 407 may use the identified results 705 in any desired manner, such as displaying statistical information to the user 400 or taking any other desired action for the user 400 based on the identified results 705. (Step 1104)

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method for a multi-country data pipeline to protect a Personally Identifying Information (PII) for each user in a plurality of users, comprising the steps of:
   receiving, by a first application, entered data from a user, wherein the first application, the entered data and the user are all physically located in a first country and the entered data comprises non-personal data and the PII;

receiving, by the first application, a schema based on a privacy policy for the first country;

identifying, by the first application, the non-personal data and the PII in the entered data based on the schema;

generating, using a one-way hash, an Identification (ID) tag for the PII;

storing, in an identity store, the ID tag and the PII, wherein the identity data store is configured so that when it receives the ID tag, the identity data store outputs the PII;

creating an anonymized data by replacing the PII, in the entered data, with the ID tag for the PII, wherein the anonymized data contains no PII;

transmitting, through the multi-country data pipeline, the anonymized data from the first country to an analytics function in a second country;

generating, by the analytics function, a results based on the anonymized data;

creating an anonymized results by adding the ID tag to the results, wherein the anonymized results contains no PII;

transmitting, through the multi-country data pipeline, the anonymized results from the second country to a second application in the first country;

upon authenticating the user, transmitting the ID tag to the identity data store;

receiving the PII associated with the ID tag from the identity data store;

adding the PII received from the identity store to the anonymized results to create an identified results; and performing an action by the second application based on the identified results.

2. The method of claim 1, wherein the schema identifies a plurality of PII fields in the entered data based on the privacy policy for the first country.

3. The method of claim 1, wherein the schema was received from, and is stored in, a third country and the first country, the second country and the third country are three different countries.

4. The method of claim 1, wherein the PII never leaves the first country.

5. The method of claim 1, wherein the first application is a different application from the second application.

6. The method of claim 1, wherein the first application is the same application as the second application.

7. The method of claim 1, wherein a plurality of schemas include the schema and the plurality of schemas are all stored in a database in a third country.

8. A method for a multi-regional data pipeline to protect Personally Identifying Information (PII) for each user in a plurality of users, comprising the steps of:

receiving, by a first application, entered data from a user, wherein the first application, the entered data and the user are all physically located in a first geographical region and the entered data comprises non-personal data and a plurality of PII;

receiving, by the first application, a schema based on a privacy policy for the first geographical region;

identifying, by the first application, the non-personal data and the plurality of PII in the entered data based on the schema;

generating, using a one-way hash, an Identification (ID) tag for each PII in the plurality of PII in the entered data, thereby generating a plurality of ID tags that correspond to the plurality of PII in the entered data;

storing, in an identity store, the plurality of PII and their corresponding plurality of ID tags, wherein the identity data store is configured so that when it receives an ID tag, the identity data store outputs the corresponding PII;

creating an anonymized data by replacing each PII in the plurality of PII with its corresponding ID tag, wherein the anonymized data contains none of the plurality of PII;

transmitting, through the multi-country data pipeline, the anonymized data from the first country to an analytics function in a second country;

generating, by the analytics function, a results based on the anonymized data;

creating an anonymized results by adding the plurality of ID tags to the results, wherein the anonymized data contains no PII;

transmitting, through the multi-country data pipeline, the anonymized results from the second country to a second application in the first country;

upon authenticating the user, transmitting the plurality of ID tags to the identity data store;

receiving the plurality of PII corresponding with the plurality of ID tags from the identity data store;

adding the PII received from the identity store to the anonymized results to create an identified results; and performing an action by the second application based on the identified results.

9. The method of claim 8, wherein the schema identifies a plurality of PII fields in the entered data based on the privacy policy of the first country.

10. The method of claim 8, wherein the schema was received from, and is stored in, a third country and the first country, the second country and the third country are three different countries.

11. The method of claim 8, wherein the PII never leaves the first country.

12. The method of claim 8, wherein the first application is a different application from the second application.

13. The method of claim 8, wherein the first application is the same application as the second application.

14. The method of claim 8, wherein a plurality of schemas include the schema and the plurality of schemas are all stored in a third country.

15. A method for a multi-country data pipeline to protect a Personally Identifying Information (PII) for each user in a plurality of users, comprising the steps of:

receiving, by a first application, entered data from a user, wherein the first application, the entered data and the user are all physically located in a first country and the entered data comprises non-personal data and the PII;

receiving, by the first application, a schema from a third country based on a privacy policy for the first country, wherein the schema is stored with a plurality of schema in a database and the plurality of schema in the database are stored in the third country;

identifying, by the first application, the non-personal data and the PII in the entered data based on the schema;

generating, using a one-way hash, an Identification (ID) tag for the PII;

storing, in an identity store, the ID tag and the PII, wherein the identity data store is configured so that when it receives the ID tag, the identity data store outputs the PII;

creating an anonymized data by replacing the PII, in the entered data, with the ID tag for the PII, wherein the anonymized data contains no PII;

transmitting, through the multi-country data pipeline, the anonymized data from the first country to an analytics function in a second country;
generating, by the analytics function, a results based on the anonymized data;
creating an anonymized results by adding the ID tag to the results, wherein the anonymized data contains no PII;
transmitting, through the multi-country data pipeline, the anonymized results from the second country to a second application in the first country;
upon authenticating the user, transmitting the ID tag to the identity data store;
receiving the PII associated with the ID tag from the identity data store;
adding the PII received from the identity store to the anonymized results to create an identified results; and
performing an action by the second application based on the identified results.

16. The method of claim 15, wherein the schema identifies a plurality of PII fields in the entered data based on the privacy policy of the first country.

17. The method of claim 15, wherein the first country, the second country and the third country are three different countries.

18. The method of claim 15, wherein the PII never leaves the first country.

19. The method of claim 15, wherein the first application is a different application from the second application.

20. The method of claim 15, wherein the first application is the same application as the second application.

* * * * *